Aug. 25, 1959 H. F. SWENSON ET AL 2,901,015
FRUIT AND VEGETABLE JUICER
Filed March 19, 1956 2 Sheets-Sheet 1

INVENTORS,
Harvey F. Swenson,
Andre A. Baudat
BY
attys.

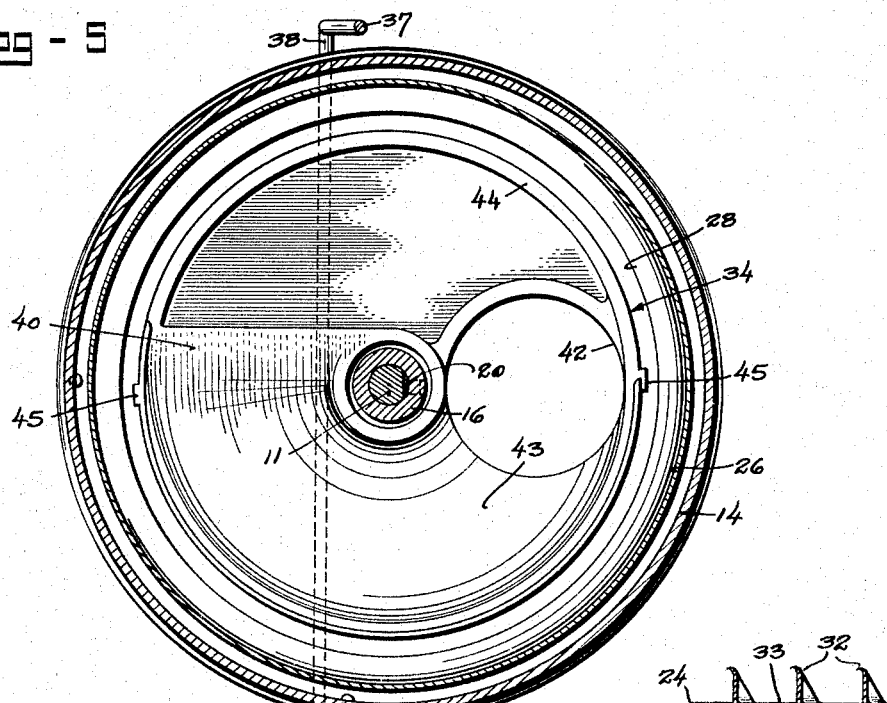
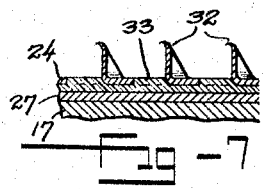
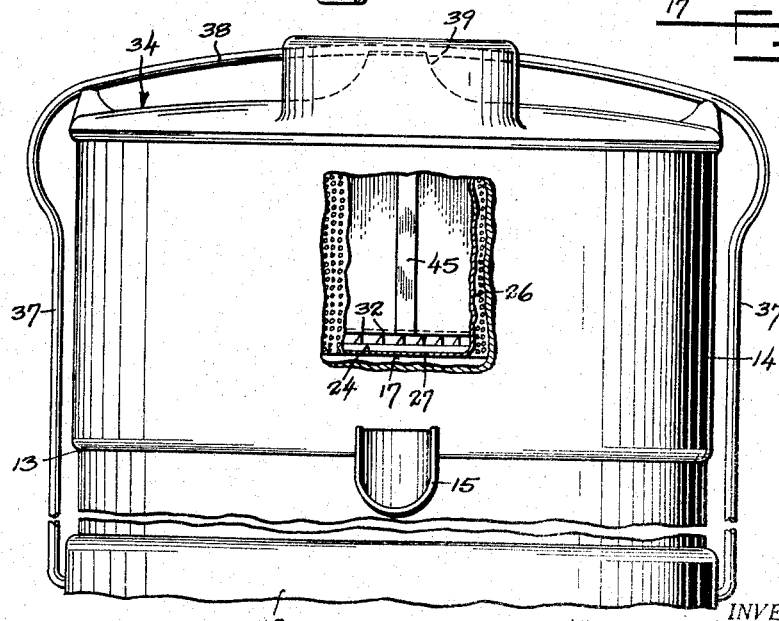

United States Patent Office 2,901,015
Patented Aug. 25, 1959

2,901,015

FRUIT AND VEGETABLE JUICER

Harvey F. Swenson and André A. Baudat, Seattle, Wash., assignors to Sweden Freezer Manufacturing Co., Seattle, Wash., a corporation of Washington Application March 19, 1956, Serial No. 572,298

3 Claims. (Cl. 146—76)

This invention relates to fruit and vegetable juicers, and has for its general object the provision of an improved juicer of the type illustrated and described in U.S. Pat. No. 2,297,880, issued October 6, 1942. Specific objects and advantages will appear and be understood in the course of the following description and claims, the invention consisting in the novel construction and in the adaptation and combination of parts hereinafter described and claimed.

In the accompanying drawings:

Fig. 5 is a horizontal section on line 5—5 of Fig. 1.

Fig. 6 is a fragmentary side elevational view of the machine with parts broken away; and Fig. 7 is a fragmentary vertical sectional detail showing the part encircled at 7 in Fig. 3.

Figure 1:
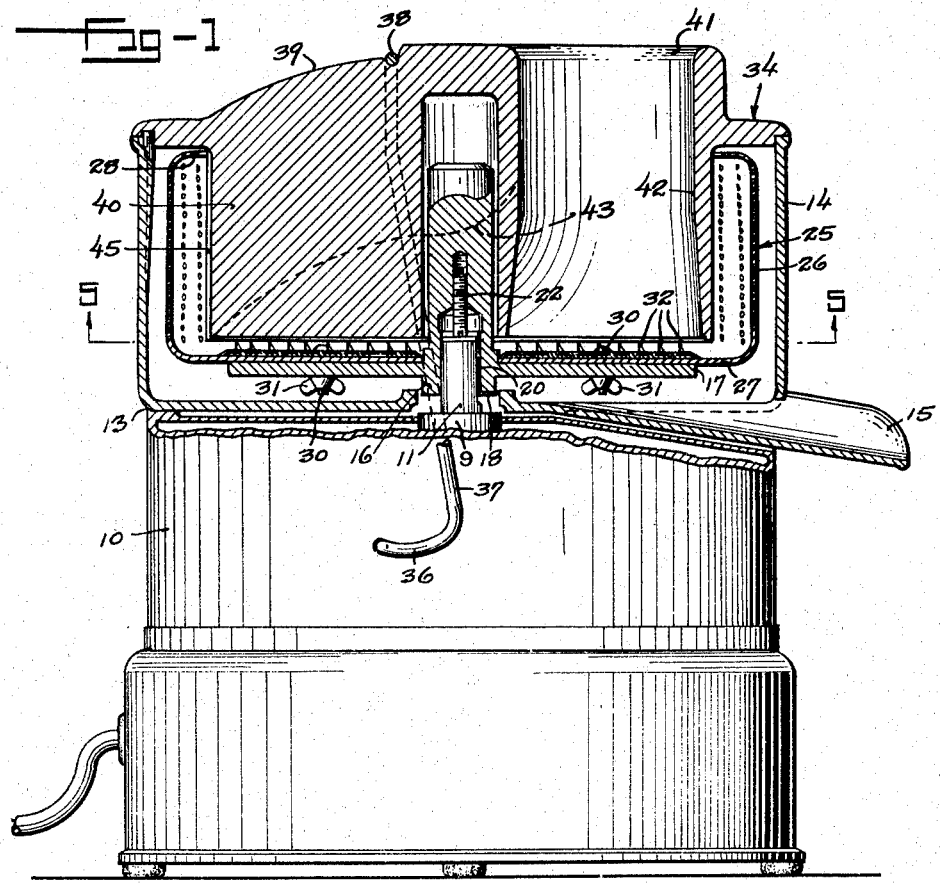
Figure 1 is a view partly in longitudinal vertical section and partly in side elevation representing a juicing machine constructed to embody the preferred teachings of the present invention.
Figures 2, 3, 4:
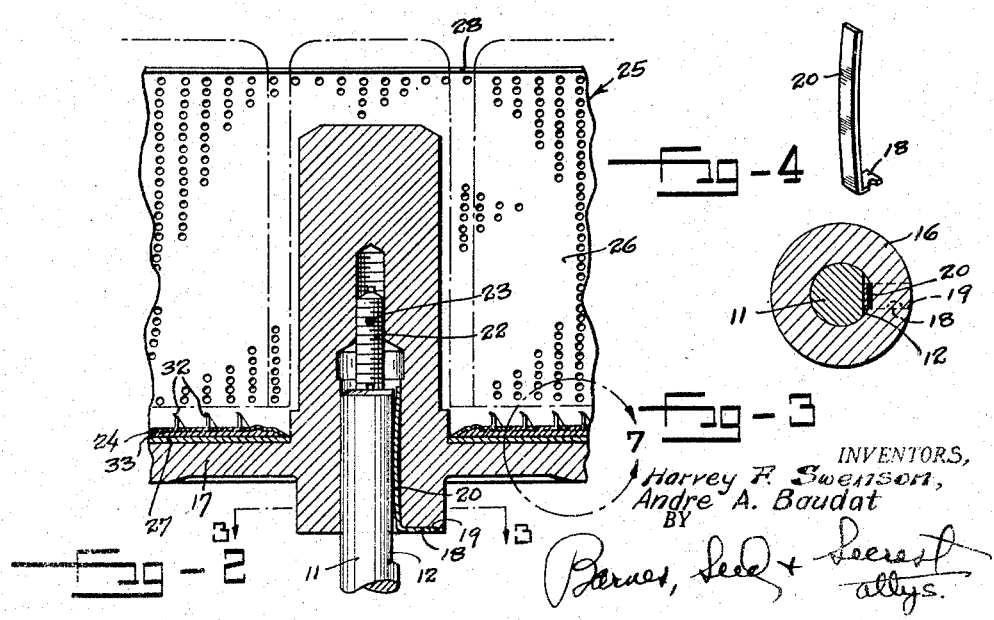
Fig. 2 is an enlarged-scale longitudinal vertical section of a fragmentary part thereof.
Fig. 3 is a horizontal sectional view on line 3—3 of Fig. 2.
Fig. 4 is a perspective view of the spring key which establishes a driving couple between the drive shaft and a fly-wheel on which a cutting disc is mounted.

Referring to said drawings the numeral 10 denotes a base in which there is housed an electric motor 9, the base being closed at the top other than for a centrally placed opening through which a prolongation 11 of the motor's armature shaft projects. Such prolongation presents a flattened side 12. There is formed on said base an upstanding marginal lip 13 producing a retaining seat for an open-top bowl 14 having a bottom discharge spout 15. The spout depends below the floor proper of the bowl and finds a mating fit in a gutter-like depression in the top wall of the base, the interfit between such gutter and spout holding the bowl against rotation relative to the base.

Removably fitted on said prolongation 11 of the motor's armature shaft is a boss 16 depending from the underside of a fly-wheel 17, and to establish a driving couple between said shaft and the boss there is provided an L-shaped key composed of spring steel and having one leg 18 thereof caught in a radial surface slot 19 of the boss while the other leg 20 lodges against the flat 12 of the shaft. Such leg 20 is moderately bowed so as to be compressed between the flat 12 and the bore of the boss when the boss is pressed downwardly onto the shaft, thereby establishing a yielding grip holding the fly-wheel securely upon the shaft. The fly-wheel is made vertically adjustable upon the drive shaft by means of a screw 22 threaded into the boss and bearing by its exposed end upon the top face of the drive shaft, said screw having a plug 23 of nylon or other like or suitable material set into a traversing hole so as to bear against the threads and yieldingly hold the screw against rotary movement from a given setting.

Surmounting the fly-wheel and, together with an associated cutting disc 24, secured thereto is a basket 25 having a perforated side wall 26 and an imperforate floor 27, and along its upper edge presenting an inturned flange 28. The means for securing said basket and disc to the fly-wheel comprises round-headed bolts 30 and complementary wing-nuts 31, with the wing-nuts at the bottom. The disc provides multiple upstanding teeth 32 which are produced by punching the same from the body of the disc. The teeth of the disc are similar to the cutting teeth illustrated and described in the above-identified patent, and this is to say that the teeth are triangular lying substantially in right angular relation to traversing radii of the disc, and are located in a spiral train with the degree of spirality such that a concentric prolongation of each tooth laps or is osculatory to the preceding tooth, thus to insure by the collective action of the teeth a cutting swath completely embracing the span between the inner and the outer limits of the tooth surface. A feature of the cutting disc is the application of a coating 33 of plastic to the underside, a synthetic resin being suitable, with such plastic entering and filling the openings in the disc from which the teeth are punched. The significance of this plastic coating is that it precludes pulp, during a juicing operation, from entering such openings and thus obviates any need to separate the disc from the basket, when cleaning the parts after a juicing operation is completed.

There is provided for the juicer a cover 34 which is detachably fitted to the casing, being secured thereto by a bail having its ends pivoted to the casing at points horizontally offset from a diameter of the base. By reason of this offset the swing arc through which the cross-arm 38 of the bail travels as it is brought, up and over the cover will progressively approach the cover. The legs 37 of the bail are each formed adjacent the pivot with a fairly substantial jog 36, one in fact which approaches a loop, the purpose thereof being to yieldingly tension the cross-arm 38 against the cover when said cross-arm snaps into place within a shallow notch (see Fig. 1) formed on the cover at the upper end of a surface rib 39 over which the cross-arm is drawn. There depends from such cover into the basket a block part 40 presenting a throat through which fruit or vegetables to be juiced are delivered to the cutting disc. The throat overlies a segmental portion of the disc and at the bottom presents a port encompassing roughly one-half the circumference of the disc. Between said delivery port at the bottom and an admission port 41 at the top the throat expands downwardly, being defined at the rear by an approximately vertical wall 42 and at the front by a sloping head wall 43, said slope progressively converging in the direction of disc rotation toward the surface of the disc. Considered in transverse section said head wall 43 has a vaulted configuration. At its front or discharge end said throat presents a plane shearing edge which parallels the face of the disc. Beyond said shearing edge and the vertical wall 42 the block is deeply recessed from the underside, and such recess is walled at the outside by a marginal skirt 44 disposed concentric to the rotary axis of the disc. For a purpose which will hereinafter appear, the block part 40 is provided in its perimeter, at diametrically opposite sides thereof, with vertical surface ribs 45 protruding slightly beyond the otherwise uninterrupted external face of the block.

In operation, the foods to be juiced are dropped into the admission port. Carried forwardly by the rotation of the disc and advancing along the sloping head wall of the throat the foods almost instantly are reduced to a comminuted form. Such comminuted tissue or pulp works under the shearing edge and by centrifugal action is compacted against the screening wall, the liberated juices being fed to the spout for reception in a glass or other receptacle placed below the same. The ribs 45 serve the important function of distributing the pulp evenly over the side-wall surface of the basket, permitting a juicing operation to be continued until the pulp layer finally reaches a thickness completely filling the space between the basket and the ribs. The function of the screw 22 is to adjust the spacing between the tips of the cutting teeth and the plane shearing edge which occurs at the delivery end of the delivery throat. It is to be understood that the teeth wear down following continued usage and the screw provides a compensating adjustment therefor.

The advantages of the invention, it is thought, will have been clearly understood from the foregoing detailed description. Minor changes will suggest themselves and may be resorted to without departing from the spirit of the invention, wherefore it is our intention that no limitations be implied and that the hereto annexed claims be given a scope fully commensurate with the broadest interpretation to which the employed language admits.

What we claim, is:

1. In a fruit and vegetable juicer, in combination: a mounting base having an electric motor housed therein with the motor's armature shaft projecting above the base, a bowl surmounting the base with an opening in its center to accommodate the armature shaft, a fly-wheel having a hub providing a bore in which said armature shaft is received, a screw adjustably threaded in the floor wall of said bore with the head bearing freely against the armature shaft to regulate the vertical setting of the fly-wheel, said screw being completely contained within the hub, a rotary basket having a perforated side wall and an imperforate floor, a rotary cutting disc presenting multiple upstanding cutting teeth, means detachably securing said basket and disc to the fly-wheel with the latter centered upon the floor of the basket and the former centered upon the fly-wheel, and means carried by the bowl depending into the basket and forming a delivery throat terminating immediately above the upper limits of the teeth for feeding the material which is to be juiced into cutting relation thereto.

2. In a fruit and vegetable juicer, in combination: a mounting base having an electric motor housed therein with the motor's armature shaft projecting above the base, a bowl surmounting the base with an opening in its center to accommodate the armature shaft, a fly-wheel having a depending hub providing a bore in which said armature shaft is received, a rotary basket having a perforated side wall and an imperforate floor, a rotary cutting disc presenting multiple upstanding cutting teeth, means detachably securing said basket and disc to the fly-wheel with the latter centered upon the floor of the basket and the former centered upon the fly-wheel, and means depending into the basket and forming a delivery throat terminating immediately above the upper limits of the teeth for feeding the material which is to be juiced into cutting relation thereto, said cutting teeth being struck upwardly from the body of the disc, said disc having a material of plastic composition applied as a permanent coating onto the underside of the disc in a manner such as to enter and fill the openings in the disc from which said teeth are struck and thus prevent pulp from entering said openings during a juicing operation.

3. A cutting blade for use in a fruit and vegetable juicer, said blade comprising a disc providing multiple cutting teeth which are struck upwardly from the body of the disc and having a material of plastic composition applied as a permanent coating to the disc in such a manner as to enter and fill the openings in the disc from which said teeth are struck and thus prevent pulp from entering said openings during a juicing operation.

References Cited in the file of this patent

UNITED STATES PATENTS

| | | |
|---|---|---|
| 825,963 | Freise | July 17, 1906 |
| 2,273,093 | Drachenberg | Feb. 17, 1942 |
| 2,297,880 | Fredrickson | Oct. 6, 1942 |
| 2,569,156 | Dybvig | Sept. 25, 1951 |

FOREIGN PATENTS

| | | |
|---|---|---|
| 850,360 | Germany | Sept. 25, 1952 |
| 284,332 | Switzerland | Nov. 17, 1952 |
| 730,105 | Great Britain | May 18, 1955 |